(12) United States Patent
Yavo et al.

(10) Patent No.: US 11,588,839 B2
(45) Date of Patent: Feb. 21, 2023

(54) LEVERAGING USER-BEHAVIOR ANALYTICS FOR IMPROVED SECURITY EVENT CLASSIFICATION

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 501 days.

(21) Appl. No.: 16/709,352

(22) Filed: Dec. 10, 2019

(65) Prior Publication Data
US 2021/0176264 A1 Jun. 10, 2021

(51) Int. Cl.
  *H04L 29/06* (2006.01)
  *G06F 16/28* (2019.01)
  *G06N 20/00* (2019.01)
  *H04L 9/40* (2022.01)

(52) U.S. Cl.
  CPC ........ *H04L 63/1425* (2013.01); *G06F 16/285* (2019.01); *G06N 20/00* (2019.01); *H04L 63/1416* (2013.01)

(58) Field of Classification Search
  CPC ............. H04L 63/1408; H04L 63/1416; H04L 63/1425; G06F 16/285; G06N 20/00
  See application file for complete search history.

(56) References Cited

U.S. PATENT DOCUMENTS

| | | | |
|---|---|---|---|
| 9,516,053 B1* | 12/2016 | Muddu | H04L 43/00 |
| 10,320,813 B1* | 6/2019 | Ahmed | H04L 63/1416 |
| 10,747,606 B1* | 8/2020 | Shemer | G06F 11/079 |
| 2017/0026391 A1* | 1/2017 | Abu-Nimeh | G06F 16/24578 |
| 2019/0188390 A1* | 6/2019 | Gunn | G06N 5/025 |
| 2020/0293944 A1* | 9/2020 | Furukawa | G06N 3/0454 |

* cited by examiner

*Primary Examiner* — Joseph P Hirl
*Assistant Examiner* — Thomas A Gyorfi
(74) *Attorney, Agent, or Firm* — HDC Intellectual Property Law, LLP (57) ABSTRACT

Systems and methods for improving security event classification by leveraging user-behavior analytics are provided. According to an embodiment, a UEBA-based security event classification service of a cloud-based security platform maintains information regarding historical user behavior of various users of an enterprise network. An endpoint protection platform running on an endpoint device that is part of the enterprise network performs an initial classification of the event, based on which the endpoint protection platform blocks activity by the process. The endpoint production platform requests input from the cloud-based security platform which causes the cloud-based security platform performs a reclassification of the event based on contextual information, multiple data feeds and the UEBA-based security event classification service. Based on the reclassification of the event, the cloud-based security platform causes the endpoint protection platform to allow the process to proceed by providing the resulting security event classification to the endpoint protection platform.

18 Claims, 8 Drawing Sheets

LEVERAGING USER-BEHAVIOR ANALYTICS FOR IMPROVED SECURITY EVENT CLASSIFICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security and classification of security events. In particular, embodiments of the present invention relate to the use of user-behavior analytics to improve security event classification.

Description of the Related Art

Existing endpoint security tools employ endpoint detection and response (EDR) technology to proactively address various types of advanced security threats by generating security events. Unfortunately, the EDR technology may not have sufficient context or information to make classification determinations with a high degree of confidence. Meanwhile, various modern security services make use of User Entity Behavior Analytics (UEBA), which models normal user behavior in an enterprise network, to recognize instances when patterns dissimilar from the normal pattern occur, thereby identifying such instances as anomalous. The ability to automatically investigate and classify security incidents/events is a key factor in improving total cost of ownership (TCO) associated with such solutions.

Therefore, there is a need in the art for improved security event classification using integration of EDR with UEBA technology.

SUMMARY

Systems and methods are described for improving security event classification by leveraging user-behavior analytics. According to one embodiment, a User Entity Behavior Analytics (UEBA)-based security service of a cloud-based security platform maintains information regarding historical user behavior of a plurality of users of an enterprise network. In response to an event associated with a process of an endpoint device that is part of the enterprise network, an endpoint protection platform running on the endpoint device performs an initial classification of the event and based on the initial classification, the endpoint protection platform blocks activity by the process. In response to the initial classification, the endpoint protection platform requests input from the cloud-based security platform by transmitting to the cloud-based security platform contextual information regarding the process and the event. The cloud-based security platform performs a reclassification of the event based on the contextual information, external data feeds and the UEBA-based security service, and causes the endpoint protection platform to allow the process to proceed by providing a resulting security event classification of the reclassification to the endpoint protection platform.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for improving security event classification by leveraging user-behavior analytics.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "data feed" generally refers to a security event classification source. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning malware classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, and the like.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif.

The term "event" generally refers to an action or behavior of a process running on an endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE). an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like. According to one embodiment, a management appliance associated with an enterprise network that manages the network security devices associated with the enterprise network incorporates the SDWAN controller functionality described herein and the network security devices operate as edge devices and/or hub devices in accordance with roles assigned to them by the management appliance.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Figure 1A:
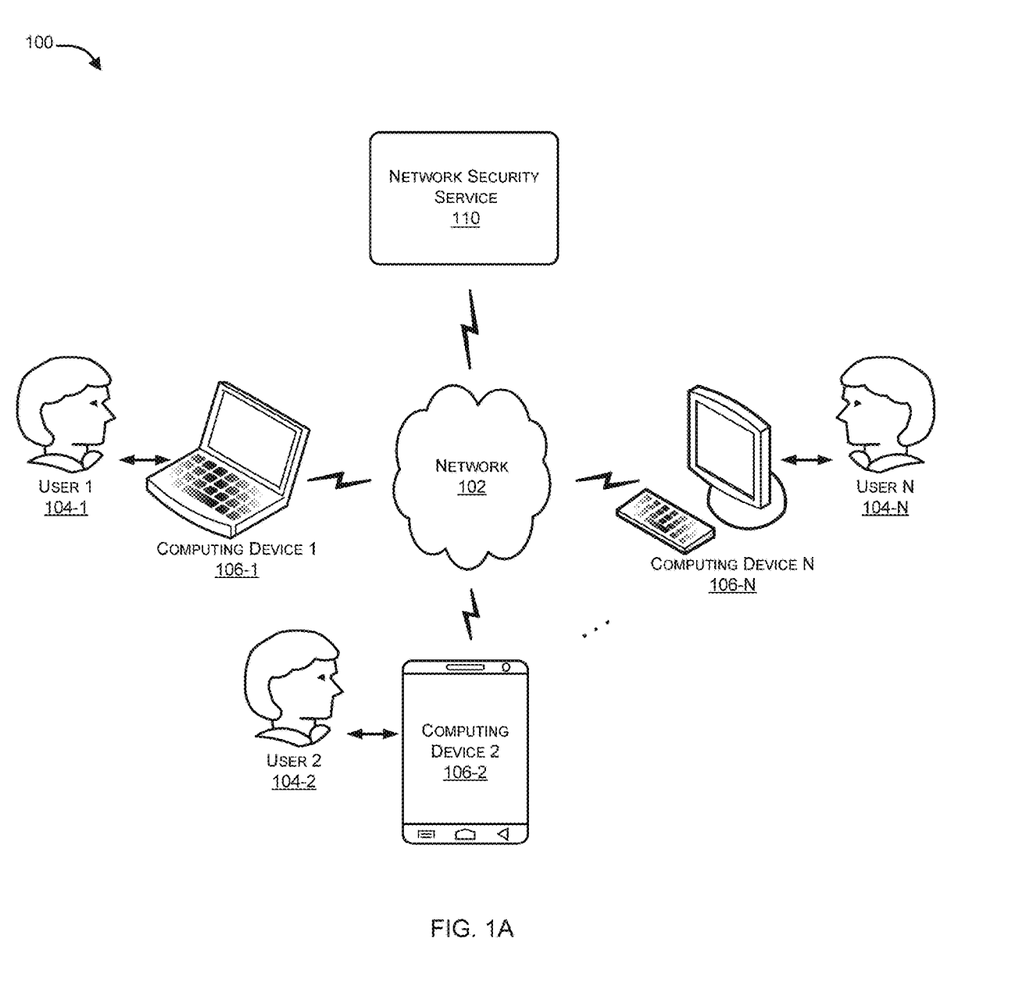
FIGS. 1A-C illustrate network architectures in which aspects of the present invention can be implemented in accordance with an embodiment of the present invention.

FIG. 1A illustrates a network architecture 100 in which aspects of the present invention can be implemented in accordance with an embodiment of the present invention. In the context of network architecture 100, a cloud-based security service 110, protecting a private network 102 is accessible to endpoint devices 106-1 . . . 106-N of the private network 102 (which may simply be referred to as network 102 herein). The cloud-based security service 110 may be implemented within a public cloud, a private cloud or a hybrid cloud. Non-limiting examples of a cloud-based security service include the enSilo Cloud Service and FORTIGUARD security services available from the assignee of the present invention.

The endpoint devices 106-1, 106-2, 106-3 . . . 106-N (which may be collectively referred to as endpoint devices 106, and may be individually referred to as endpoint device 106 herein) associated with network 102 may include, but are not limited to, personal computers, smart devices, web-enabled devices, hand-held devices, laptops, mobile devices, and the like. In one embodiment, cloud-based security service 106 may interact with users 104-1, 104-2 . . . 104-N (which may be collectively referred to as users 104, and may be individually referred to as a user 104 herein) through network 102 via their respective endpoint devices 106, for example, in the form of notifications or alerts regarding security events via a user interface associated with the endpoint protection platform.

Those skilled in the art will appreciate that, network 102 can be a wireless network, a wired network or a combination thereof that can be implemented as one of the various types of networks, such as an Intranet, a Local Area Network (LAN), a Wide Area Network (WAN), the Internet, and the like. Further, network 102 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, the cloud-based security service 110 can provide multiple data feeds, including a User Entity Behavior Analytics (UEBA)-based security event classification service, for processing information relating to a security event observed at an endpoint device 106. Each data feed may independently produce a classification result for the security event to provide multiple data points for a machine-learning malware classifier. In one embodiment, the UEBA-based security event classification service facilitates more accurate security event classification.

In response to occurrence of an event associated with a process running on an endpoint device 106, an endpoint protection platform running on endpoint device 106 can perform an initial local classification of the event. In response to the initial classification, the endpoint protection platform may transmit the initial classifications and contextual information regarding the process and the event to cloud-based security service 110 for reclassification. The contextual information may include, for example, a combination of a command line information (e.g., a command line instruction and/or associated parameters) that were used to execute the process, a process execution chain, a memory dump associated with the process, and the like.

Responsive to receipt of the request for event classification from the endpoint protection platform, cloud-based security service 110 may collect various classification results for the event from multiple data feeds by directing each of the multiple data feeds to produce a classification result for the event based on the contextual information received from the endpoint protection platform. Cloud-based security service 110 may then generate a revised classification result for the event by applying a machine-learning malware classifier to the initial classification and the various classification results of the multiple data feeds. Alternatively, the revised classification result may be obtained by merging the classification results of the multiple data feeds and the initial classification based on a set of predefined rules.

Figure 1B:
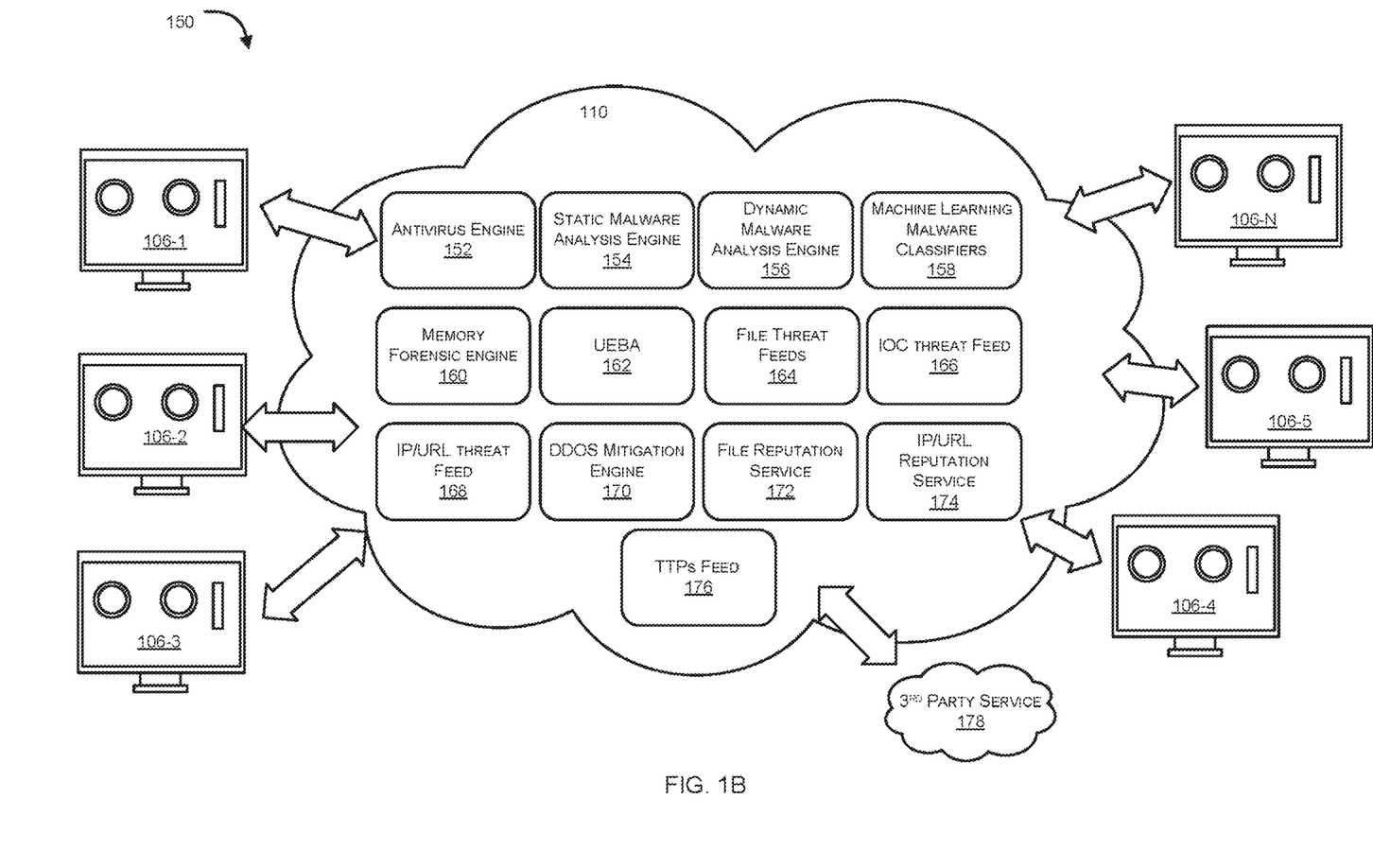

FIG. 1B illustrates a cloud-based network architecture 150 in which aspects of the present invention can be implemented in accordance with an embodiment of the present invention. In the context of the present example, cloud-based security service 110 implements multiple data feeds 152-176 that are each capable of independently classifying a given security event and producing a classification result. Cloud-based security service 110 can be used for augmenting or reclassifying an initial classification of an event made by an endpoint protection platform protecting the endpoint device on which the process that produced the event is running. Further, in some embodiment, when the revised classification of the event is inconclusive, malicious, or suspicious, the cloud-based security service may use a UEBA-based security event classification service (e.g., UEBA 162) to augment the revised classification to produce a final classification so as to reduce false positives, for example.

Non-limiting examples of data feeds that may be used depending upon the particular implementation include various types of endpoint protection platforms (e.g., running on other endpoint devices 106), an antivirus engine 152, a static malware analysis engine 154, a dynamic malware analysis engine 156 (e.g., a sandbox), machine-learning malware classifiers 158, a memory forensic engine 160, User and Entity Behavior Analytics (UEBA) 162, file threat-feeds 164, an IoC threat feeds 166, an IP/URL threat feed 168, a distributed denial of service (DDoS) mitigation engine 170, a file reputation service 172, an IP/URL reputation service 174, a TTPs feed 176, third party network services 178, and the like.

While existing rule-based classification approaches that attempt to join multiple classification sources require per-data feed normalization to allow the rule engine to use the feed-specific results, no such normalization is required in accordance with the embodiments described herein based on a machine-learning malware classification model as the machine-learning malware classification model can simply be trained to perform the revised classification based on the native outputs of the multiple data feeds employed.

Figure 1C:
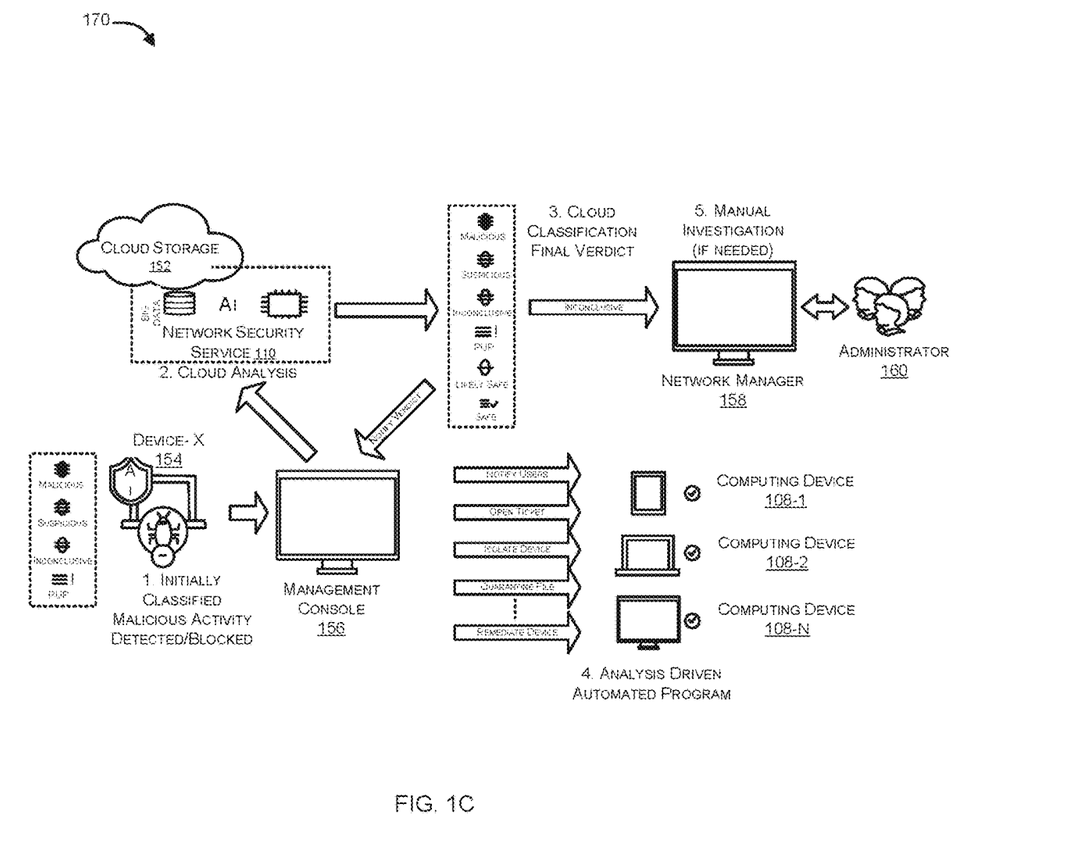

Referring to architectures 100, 150 and 170, a cloud-based security platform including network security service 110 along and cloud storage 152, may maintain information regarding historical user behavior of various users 104 of network 102 as part of a UEBA security event classification service (e.g., UEBA 162 of FIG. 1B). For example, the UEBA security event classification service may obtain the information regarding historical user behavior by observing events initiated at computing devices 106 and store the obtained information within cloud storage 152 for a predefined time-period. In one example, the information regarding historical user behavior for each user 104 includes historical data regarding a number of events initiated at computing device 106 and the type of the events initiated at computing device 106.

In one embodiment, an endpoint protection platform running on computing device 106 performs an initial classification of an observed event, which is associated with a process of computing device 106. In an implementation, the endpoint protection platform detects or blocks activity by the process based on the initial classification. For example, endpoint protection platform may classify the event as a suspicious event when the process exhibits an anomaly and may block the activity of the process when the event is classified as suspicious event. Further, the endpoint protection platform may request input from cloud-based security platform by transmitting contextual information regarding the process and the event to network security service 110. The contextual information can include information indicative of an application with which the process is associated, information identifying the user, command line information used to execute the process, an execution chain associated with the process, a memory dump associated with the process, and environment variables associated with the process.

Cloud-based security platform may perform a reclassification of the event based on the contextual information, external data feeds and various of the data feeds implemented within the cloud-based security platform. For example, network security service may reclassify the event into at least one category including malicious, suspicious, inconclusive, potentially unwanted program (PUP), likely safe and safe. In one embodiment, when the reclassification results in a classification of likely safe and safe, the classification may be deemed the final classification; however, when the reclassification results in a classification of malicious, suspicious, inconclusive, or PUP, the classification may be further augmented by taking into consideration user behavior analysis to generate the final classification.

After the final classification has been achieved, cloud-based security platform may then cause the endpoint protection platform to take appropriate action with respect to the process at issue by providing the final classification to the endpoint protection platform. For example, the cloud-based security platform may cause the endpoint protection platform to permit or deny further activity associated with the process. In some embodiments, the cloud-based security service may also cause the endpoint protection platform to perform an automated incident response by providing an output of an automated response engine of the cloud-based security service to the endpoint protection platform. The automated incident response may be any or a combination of notifying the end user of the endpoint device regarding the event, notifying a network administrator regarding the event, opening a ticket, isolating the endpoint device, quarantining the file associated with the process, and remediating the endpoint device. According to one embodiment, an automated incident response engine implemented within the cloud-based security service orchestrates incident response operations using tailor made playbooks based on the final classification of the security event.

To provide clarity, embodiments of the present invention are further explained with reference to the example illustrated by FIG. 1C. In the context of this example, considering initial classification being performed by endpoint protection platform running at computing device 154. At step 1, the endpoint protection platform may initially classify an observed event associated with a process as malicious, suspicious, inconclusive or PUP, for example, and may block the activity of the process based on the initial classification. The cloud-based security platform including network security service 110 and cloud storage 152 may be managed, configured, monitored and/or operated using a management console 156. At step 2, the endpoint production platform may request cloud analysis of the initial classification by transmitting contextual information regarding the process and the event to network security service 110.

At step 3, the cloud-based security platform performs a reclassification of the event based on one or more of the contextual information, external data feeds and multiple of the data feeds implemented within the cloud-based security platform. According to one embodiment, cloud-based security service generates a revised classification result for the event by applying a machine-learning malware classifier to the initial classification and the various classification results of the multiple data feeds. In some embodiment, when the revised classification of the event is inconclusive, malicious, suspicious or PUP, the cloud-based security service may use a UEBA-based security event classification service (e.g., UEBA 162) to augment the revised classification to produce a final classification so as to reduce false positives, for example. For example, prior to making use of the UEBA-based security event classification service, the cloud-based security service may produce a revised classification of inconclusive, malicious, suspicious or PUP and after augmenting the revised classification with the UEBA-based security event classification service, the cloud-based security service may generate a final classification for the event at issue as likely safe or safe. Non-limiting examples illustrating when a revised classification of inconclusive, malicious, suspicious or PUP may be further reclassified as likely safe or safe, include a scenario in which an unknown/unrecognized file type is determined based on user behavior analysis to be a file type that is commonly used by a significant number of users of the private network, a scenario in which an unknown/unrecognized application is determined based on user behavior analysis to be an application that is commonly used by a significant number of users of the private network and other scenarios in which a particular event appears to be initially suspicious, but is determined based on user behavior analysis to represent something fairly common in the context of the private network.

In one embodiment, the cloud-based security platform may augment the revised classification by extracting commonality user behavior information associated with the event from the information regarding historical user behavior of various users 104 using a machine-learning approach. Based on the additional information supplied by the user behavior analysis, in an example, the cloud-based security platform can provide a final verdict relating to the security event by classifying it as any of a malicious event, a suspicious event, a PUP event, an inconclusive event, a likely safe event or a safe event. The final verdict can be provided to a network manager 158 and management console 156.

At step 5, when the event is ultimately classified as a suspicious event or an inconclusive event, the cloud-based security platform, may trigger a manual investigation by an administrator using a network manager 158. Additionally, when the event is ultimately finally classified as a malicious event or a pup event, for example, the cloud-based security platform, may cause the endpoint protection platform to continue to deny further execution of the process as issue. Furthermore, as noted above, the cloud-based security platform may also cause the endpoint protection platform to perform an automated incident response including any or a combination of notifying the user of the event, isolating the computing device associated with the event, quarantining a file associated with the event and remediating the anomaly associated with the event. The action can also be notified to other computing devices 108 of network 102. Further, when the final classification of the event is likely safe or safe, the cloud-based security platform, permits execution or resumption of execution of the process by the endpoint protection platform.

Figure 2:
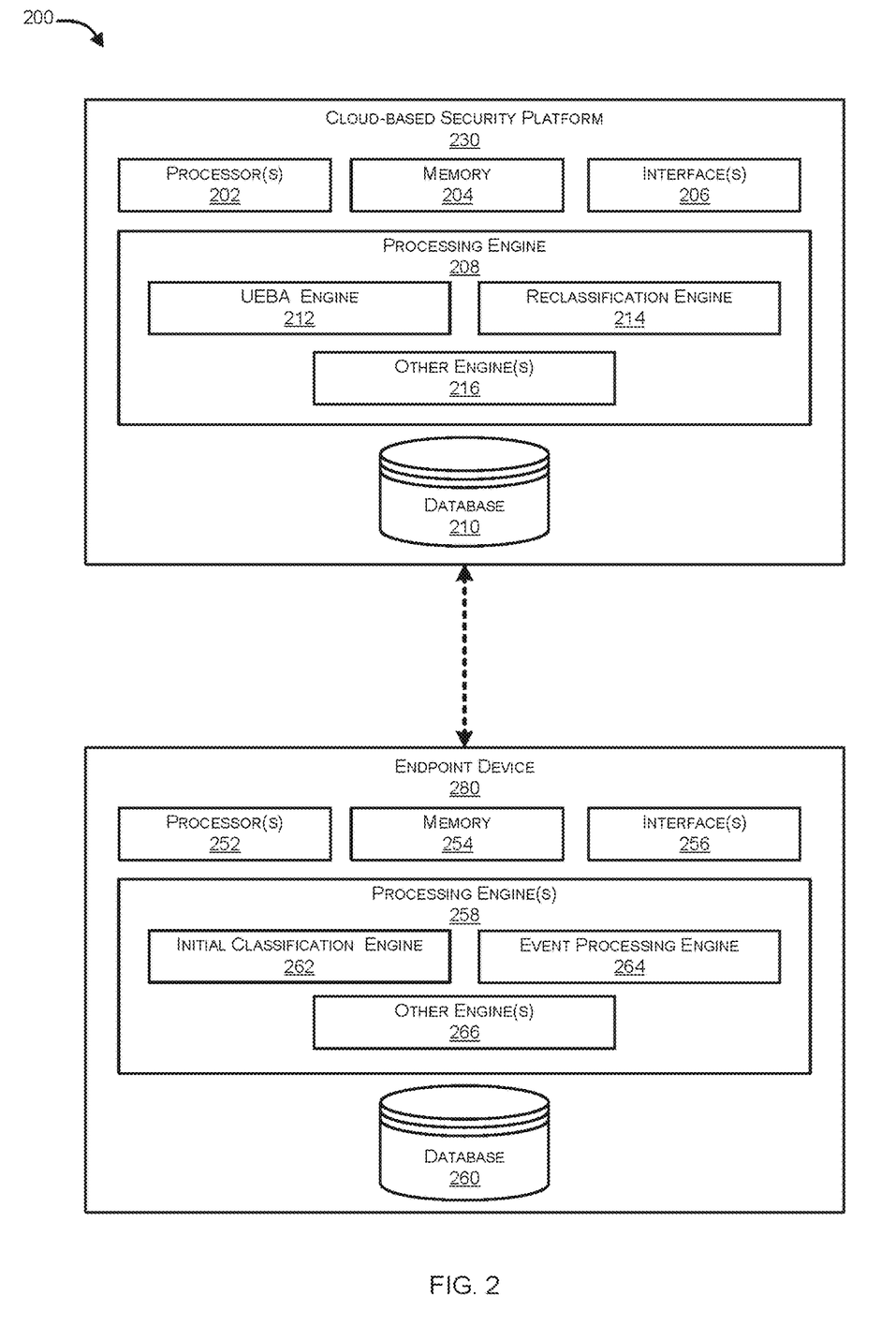
FIG. 2 is a block diagram illustrating functional components of a cloud based security platform and an endpoint device in accordance with an embodiment of the present invention.

FIG. 2 is a block diagram 200 illustrating functional components of a cloud based security platform 230 and an endpoint device 280 in accordance with an embodiment of the present invention. In the context of the present example, cloud-based security platform 230 and endpoint device 280, can include one or more processor(s) 202 and 252 respectively. Processor(s) 202 and 252 can be implemented as one or more microprocessors, microcomputers, microcontrollers, digital signal processors, central processing units, logic circuitries, and/or any devices that manipulate data based on operational instructions. Among other capabilities, processor(s) 202 and 252 are configured to fetch and execute computer-readable instructions stored in a memory 204 and 254 respectively. Memory 204 and 254 can store one or more computer-readable instructions or routines, which may be fetched and executed to create or share the data units over a network service. Memory 204 and 254 can include any non-transitory storage device including, for example, volatile memory such as RAM, or non-volatile memory such as EPROM, flash memory, and the like. In an example embodiment, memory 204 and 254 may be a local memory or may be located remotely, such as a server, a file server, a data server, and the Cloud.

Cloud-based security platform 230 and endpoint device 280 can also include one or more interface(s) 206 and 256 respectively. Interface(s) 206 and 256 may include a variety of interfaces, for example, interfaces for data input and output devices, referred to as I/O devices, storage devices, and the like to facilitate communication with various devices and functional components.

Processing engine(s) 208 and 258 can be implemented as a combination of hardware and software or firmware programming (for example, programmable instructions) to implement one or more functionalities of Processing engine(s) 208 and 258. In the examples described herein, such combinations of hardware and software or firmware programming may be implemented in several different ways. For example, the programming for processing engine(s) 208 and 258 may be processor executable instructions stored on a non-transitory machine-readable storage medium and the hardware for processing engine(s) 208 and 258 may include a processing resource (for example, one or more processors), to execute such instructions. In the examples, the machine-readable storage medium may store instructions that, when executed by the processing resource, implement processing engine(s) 208 and 258. In such examples, cloud-based security platform 230 and endpoint device 280 can include the machine-readable storage medium storing the instructions and the processing resource to execute the instructions, or the machine-readable storage medium may be separate but accessible to cloud-based security platform 230, endpoint device 280 and the processing resource. In other examples, processing engine(s) 208 and 258 may be implemented by electronic circuitry. Databases 210 and 260 can include data that is either stored or generated as a result of functionalities implemented by any of the components of processing engine(s) 208 and 258 respectively.

In an example, processing engine 208 can include a UEBA engine 212, a reclassification engine 214, and other engine(s) 216. Other engine(s) 216 can implement functionalities that supplement applications or functions performed by cloud-based security platform 230 or processing engine(s) 208.

In an example, processing engine(s) 258 can include an initial classification engine 262, an event processing engine 264, and other engine(s) 266. Other engine(s) 266 can implement functionalities that supplement applications or functions performed by endpoint device 280 or processing engine 258.

According to an embodiment, UEBA engine 212 provides a UEBA-based security event classification service including, maintaining information regarding historical user behavior of various users of an enterprise network. In one example, the information regarding historical user behavior for each user includes historical data regarding number of events associated with processes initiated at corresponding endpoint device and type of the events initiated at the corresponding endpoint device.

Initial classification engine 262 performs an initial classification of an event associated with a process of endpoint device 280 that is part of the enterprise network. In response to the initial classification, initial classification engine 262 may direct event processing engine 264 to block activity by the process and may request input from cloud-based security platform 230 by transmitting contextual information regarding the process and the event to reclassification engine 214. The contextual information can include information indicative of an application with which the process is associated and information identifying the user, for example, a command line used to execute the process, execution chain associated with the process, memory dump associated with the process, user that executes the command line and environment variables associated with the process.

Reclassification engine 214 can perform a reclassification of the event based on a machine-learning approach using the contextual information, external data feeds and UEBA engine 212. Reclassification engine 214 may then cause event processing engine 264 to allow the process to proceed by providing a resulting security event classification of the reclassification to event processing engine 264.

Figure 3:
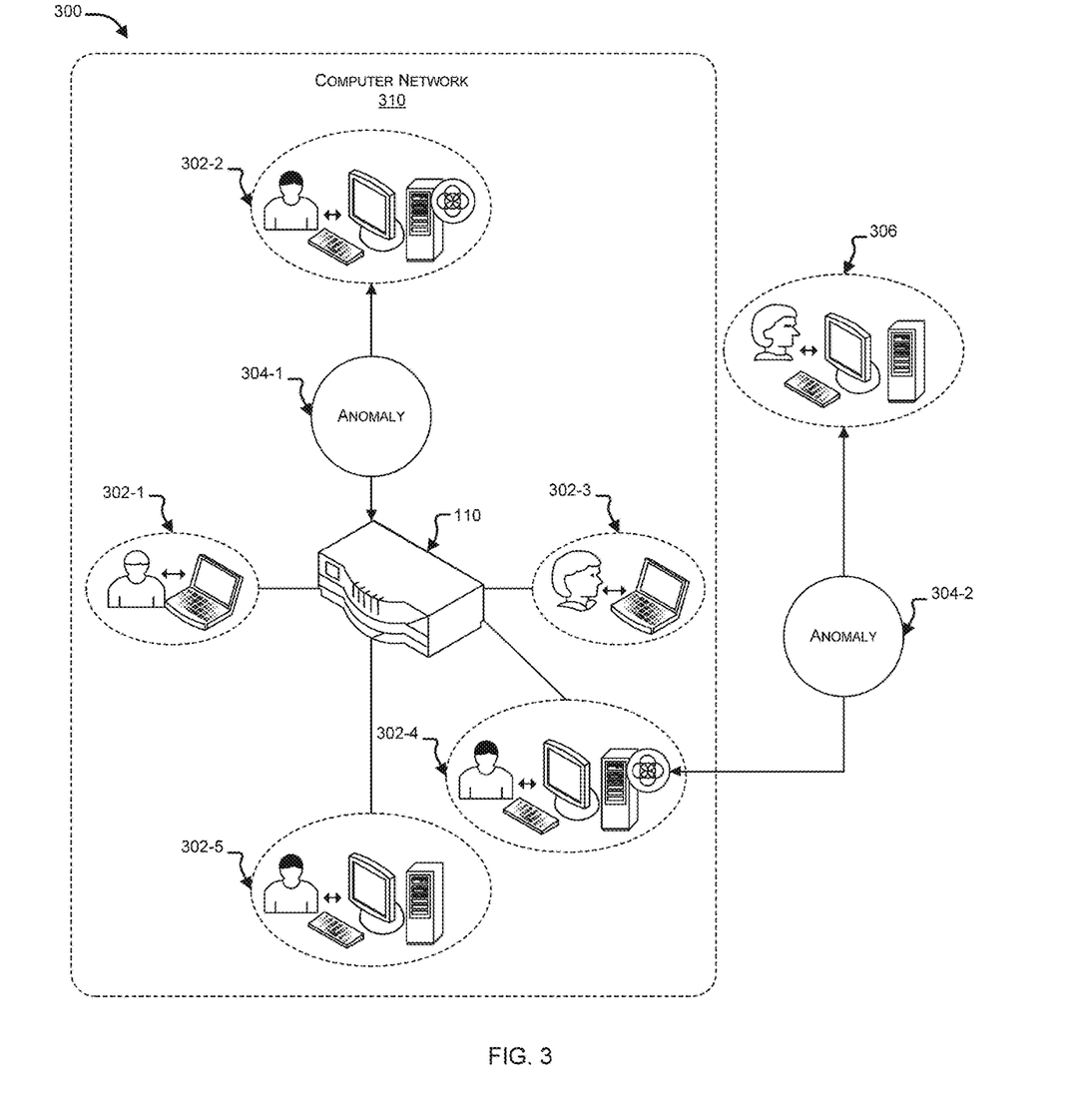
FIG. 3 illustrates an example of anomalous events in a network in accordance with an embodiment of the present invention.

FIG. 3 illustrates an example of anomalous events in a network in accordance with an embodiment of the present invention. In the context of the present example, an enterprise network or other private network as represented by computer network 310 (enclosed by the dotted line) includes internal entities 302-1, 302-2, 302-3, 302-4 and 302-5, each comprising a user and a corresponding computer. As used herein, an entity should be broadly understood to include any sort of element or component operating within or otherwise associated with a computer network. For example, entities include physical computing devices, virtual computing devices, users, software modules, accounts, identifiers, and addresses. Operating outside of computer network 310 can be an external entity 306 that may be associated with a malicious actor that may be causing anomaly 304-2. Communications may occur between different internal entities e.g., 302-4 and external entity 306, and also between internal entities 302-1, 302-2, 302-3, 302-4 and 302-5, which may cause an anomaly in the computer network 310, e.g. 304-1. In some embodiments, analysis of these events associated with these communications or processes by cloud-based security platform and endpoint protection platforms running on the computing devices can lead to the detection of anomalies 304-1 and 304-2 and compromised computing devices associated with internal entities 304-2 and 302-4. For example, as described above, endpoint protection platform can request a reclassification by network security service 110 so that network security service 110 can cause the endpoint protection platform to allow the process to proceed in case a resulting security event classification associated with perceived anomalies 304-1 and 304-2 is determined to be safe by network security service 110 based on the use of UEBA technology.

Figure 4:
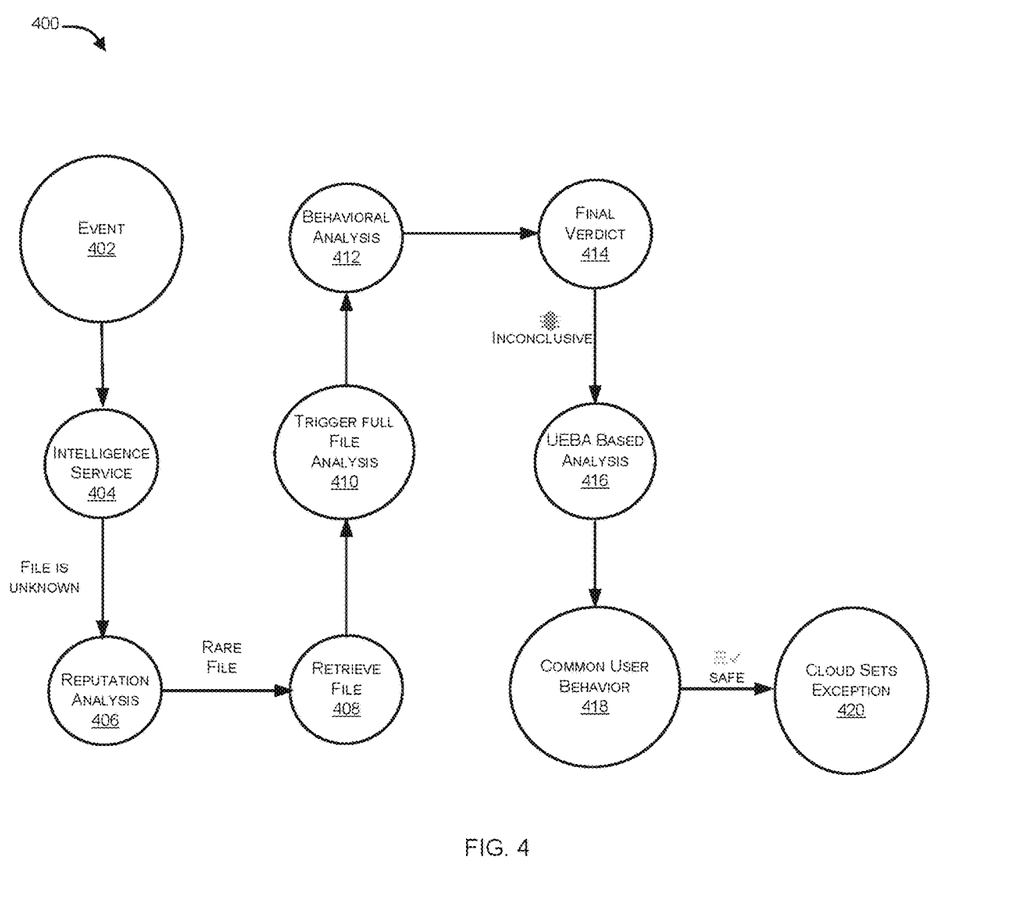
FIG. 4 illustrates exemplary flow for reclassification of a suspicious event in accordance with an embodiment of the present invention.

FIG. 4 illustrates exemplary flow 400 for reclassification of a suspicious event in accordance with an embodiment of the present invention. In the context of the present example, the process begins by endpoint protection platform observing an event 402 initiated by a process running on the endpoint device protected by the endpoint protection platform. The endpoint protection platform may then analyze the event using an intelligence service 404. If the file is determined to be unknown, the event associated with the process may then be passed through a reputation analysis, which may result in an initial classification. In other embodiments, the initial classification may involve additional or alternative analysis. For example, depending upon the particular implementation, this initial classification may be machine-learning based, heuristics-based or a combination thereof.

After initial classification, the endpoint protection platform retrieves contextual information, e.g., retrieve file 408, and then transmits the file to the cloud-based security platform to trigger full file analysis 410. In the context of the present example, the cloud-based security platform first performs behavioral analysis 412 (e.g., sandboxing analysis) on the file associated with the event at issue and determines final verdict 414. If the revised classification (e.g., final verdict 414) is malicious, suspicious, inconclusive or PUP, the cloud-based security platform augments its revised classification with UEBA analysis. For example, in the context of the present example the final verdict 414 is inconclusive. As such, the cloud-based security platform performs UEBA based analysis 416. In one embodiment, this involves determining whether the behavior at issue represents common user behavior 418 by analyzing the information regarding historical user behavior of various users. If the event is now determined to be likely safe or same, the cloud-based security platform may set an exception 420 so as to whitelist this event in the future. Additionally, the cloud-based security platform may allow the endpoint protection platform to proceed with execution of the process associated with the event.

In view of the foregoing, embodiments of the present invention discloses a technique to reclassify user activity perceived to be suspicious or malicious based on commonality rates. Using UEBA based analysis can establish a baseline for an activity of a user or a group of users; hence, it becomes possible to disregard seemingly malicious behavior based on common activities by a user or a group of users. For example, an EDR solution may initially classify an event associated with an unknown application that is attempting to access sensitive data as malicious; however, by making use of user behavior analysis (e.g., a UEBA-based security event classification service), the application may be recognized as one that is commonly used by the entire accounting team to work with such data. In this manner, user behavior analysis may provide a clear indicator that the initially perceived suspicious behavior should be permitted and the execution of the unknown application by the endpoint device should be allowed to proceed.

Figure 5:
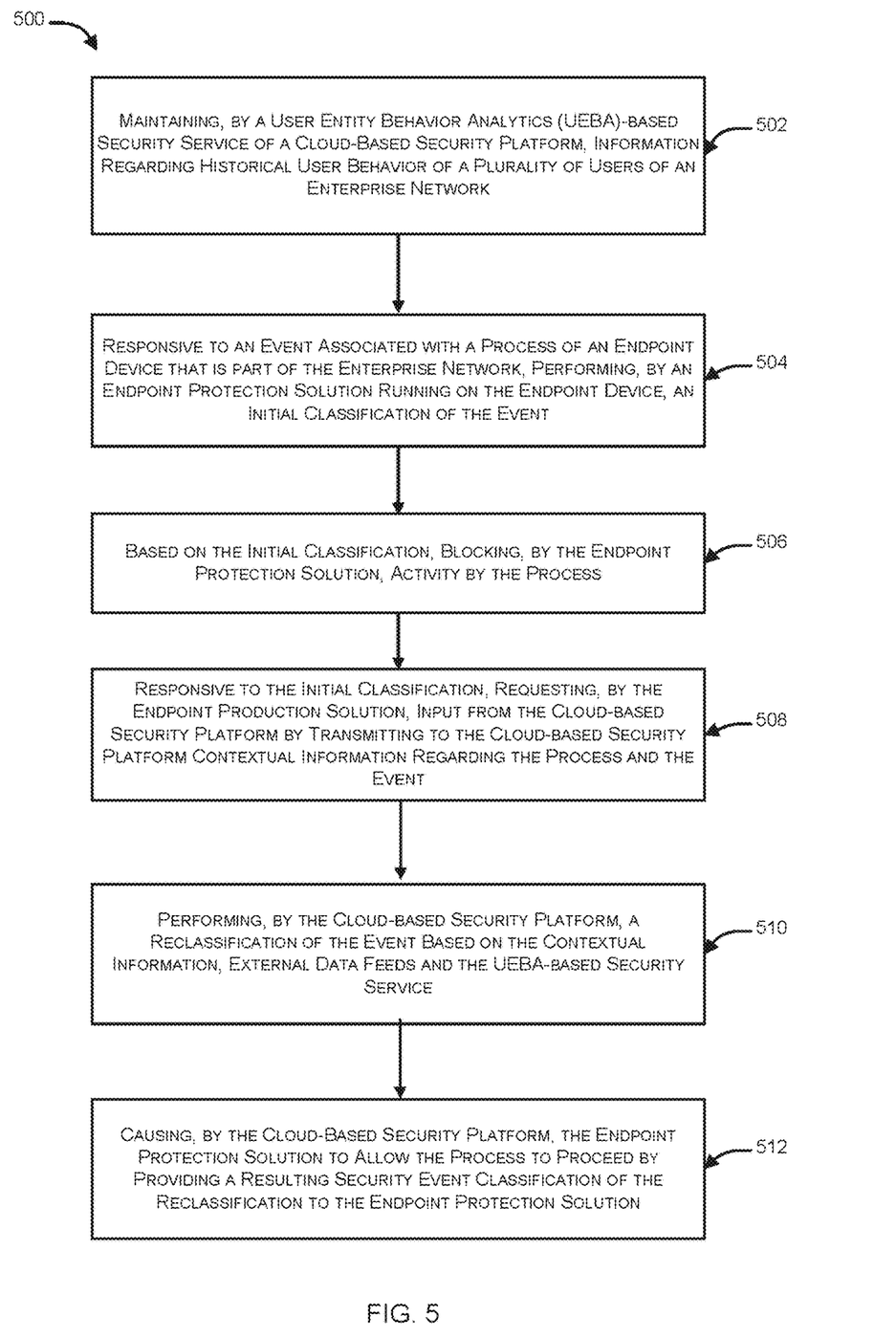
FIG. 5 is a flow diagram illustrating a process performed by a cloud-based security platform and an endpoint protection platform in combination in accordance with an embodiment of the present invention.

FIG. 5 is a flow diagram 500 illustrating a process performed by a cloud-based security platform and an endpoint protection platform in combination in accordance with an embodiment of the present invention. The processing described with reference to FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by a combination of one or more computer systems in physical or virtual form, such as computer system 600 described with reference to FIG. 6.

At block 502, a UEBA-based security event classification service of a cloud-based security platform maintains information regarding historical user behavior of a plurality of users of an enterprise network.

At block 504, in response to an observed event associated with a process of an endpoint device that is part of the enterprise network, an endpoint protection platform running on the endpoint device performs an initial classification of the event. Depending upon the particular implementation, this initial classification may be machine-learning based, heuristics-based or a combination thereof.

At block 506, the endpoint protection platform blocks activity by the process based on the initial classification. For example, endpoint protection platform may at least temporarily suspend activity associated with a process when an event associated with the process has been initially locally classified as inconclusive, malicious, suspicious or PUP.

At block 508, in response to the initial classification, the endpoint protection platform requests input from the cloud-based security platform by transmitting to the cloud-based security platform contextual information regarding the process and the event. For example, the endpoint protection platform may leverage additional knowledge and power provided by the cloud-based service by transmitting the initial classification and contextual information regarding the process and event to the cloud-based service.

At block 510, the cloud-based security platform performs a reclassification of the event based on one or more of the contextual information, external data feeds and internal data feeds. According to one embodiment, the cloud-based security platform generates a revised classification result for the event by applying a machine-learning malware classifier to the initial classification and the various classification results of the multiple data feeds. Alternatively, the revised classification result may be obtained by merging the classification results of the multiple data feeds and the initial classification based on a set of predefined rules. In some embodiment, when the revised classification of the event is inconclusive, malicious, suspicious or PUP, the cloud-based security platform may use a UEBA-based security event classification service (e.g., UEBA 162) to augment the revised classification to produce a final classification so as to reduce false positives, for example.

Assuming the final classification is likely safe or safe, at block 512, the cloud-based security platform causes the endpoint protection platform to allow the process to proceed by providing the final classification to the endpoint protection platform.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 6:
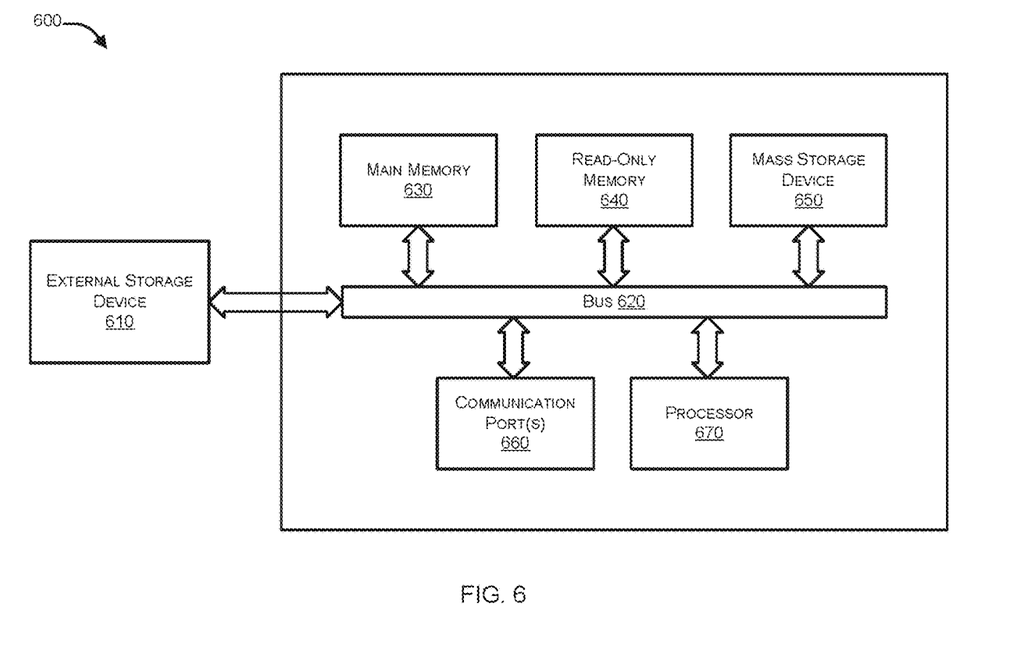
FIG. 6 illustrates an exemplary computer system in which or with which embodiments of the present invention may be utilized.

FIG. 6 illustrates an exemplary computer system 600 in which or with which embodiments of the present invention may be utilized. For example, computer system 600 may represent a portion of a cloud-based network security service (e.g., network security service 110), an endpoint device (e.g., endpoint device 106) or a server within a cloud-based security service (e.g., network security service 110). While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment. Furthermore, while in some embodiments, the various data feeds discussed herein have been described with reference to various security event classification services, it is to be appreciated that one or more of the various security event classification sources may be network security devices represented in virtual or physical form.

As shown in FIG. 6, computer system 600, includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    maintaining, by a User Entity Behavior Analytics (UEBA)-based security event service of a cloud-based security platform, information regarding historical user behavior of a plurality of users of an enterprise network;
    responsive to an event associated with a process of an endpoint device that is part of the enterprise network, performing, by an endpoint protection platform running on the endpoint device, an initial classification of the event;
    based on the initial classification, blocking, by the endpoint protection platform, activity by the process;
    responsive to the initial classification, requesting, by the endpoint protection platform, input from the cloud-based security platform by transmitting to the cloud-based security platform contextual information regarding to the process and the event;
    performing, by the cloud-based security platform, a reclassification of the event based on the contextual information, multiple data feeds internal or external to the cloud-based security platform and the UEBA-based security event classification service;
    causing, by the cloud-based security platform, the endpoint protection platform to allow the process to proceed by providing a resulting security event classification of the reclassification to the endpoint protection platform.

2. The method of claim 1, wherein the contextual information includes any or a combination of information indicative of an application with which the process is associated, information identifying the user, information indicating a command line used to execute the process, information identifying execution chain associated with the process, information indicating memory dump associated with the process, information identifying the user that executes the command line and information regarding environment variables associated with the process.

3. The method of claim 1, wherein the information regarding historical user behavior for each user of the plurality of users includes historical data regarding a number of events initiated at each computing device of the plurality of computing devices and a type of the events initiated at each computing device.

4. The method of claim 1, wherein the information regarding historical user behavior for each user of the plurality of users is stored for a pre-defined time period.

5. The method of claim 1, wherein the cloud-based security platform extracts commonality user behavior information associated with the event from the information regarding historical user behavior of the plurality of users using a machine-learning based approach.

6. The method of claim 1, wherein the resulting security event classification includes malicious, suspicious, potentially unwanted program (PUP), inconclusive, likely safe and safe.

7. The method of claim 6, wherein said performing, by the cloud-based security platform, a reclassification of the event comprises when the event is reclassified based on the contextual information and the multiple data feeds as suspicious or inconclusive, then further evaluating the event with reference to the UEBA-based security event classification service.

8. The method of claim 6, wherein when the event is ultimately classified as malicious, the cloud-based security platform, causes the endpoint protection platform to deny further execution of the process.

9. The method of claim 6, wherein when the event is ultimately classified as likely safe or safe, the cloud-based security platform, causes the endpoint protection platform to permit execution of the process.

10. A non-transitory computer-readable storage medium embodying a set of instructions, which when executed by one or more processing resources of a cloud-based security platform protecting a private network, causes the one or more processing resources to perform a method comprising:
   maintaining, by a User Entity Behavior Analytics (UEBA)-based security event classification service of the cloud-based security platform, information regarding historical user behavior of a plurality of users of a private network;
   receiving, from an endpoint protection platform running on an endpoint device associated with the private network, an initial classification of an event associated with a process of the endpoint device and contextual information regarding the process and the event;
   responsive to receipt of the initial classification and the contextual information, performing a reclassification of the event based on the contextual information, multiple data feeds internal or external to the cloud-based security platform and the UEBA-based security event classification service external data feeds and the UEBA-based security service; and
   causing the endpoint protection platform to allow the process to proceed by providing a resulting security event classification of the reclassification to the endpoint protection platform.

11. The non-transitory computer-readable storage medium of claim 10, wherein the contextual information includes any or a combination of information indicative of an application with which the process is associated, information identifying the user, information indicating a command line used to execute the process, information identifying execution chain associated with the process, information indicating memory dump associated with the process, information identifying the user that executes the command line and information regarding environment variables associated with the process.

12. The non-transitory computer-readable storage medium of claim 10, wherein the information regarding historical user behavior for each user of the plurality of users includes historical data regarding a number of events initiated at each computing device of the plurality of computing devices and a type of the events initiated at each computing device.

13. The non-transitory computer-readable storage medium of claim 10, wherein the information regarding historical user behavior for each user of the plurality of users is stored for a pre-defined time period.

14. The non-transitory computer-readable storage medium of claim 10, wherein the cloud-based security platform extracts commonality user behavior information associated with the event from the information regarding historical user behavior of the plurality of users using a machine-learning based approach.

15. The non-transitory computer-readable storage medium of claim 10, wherein the resulting security event classification includes malicious, suspicious, potentially unwanted program (PUP), inconclusive, likely safe and safe.

16. The non-transitory computer-readable storage medium of claim 15, wherein said performing a reclassification of the event comprises when the event is reclassified based on the contextual information and the multiple data feeds as suspicious or inconclusive, then further evaluating the event with reference to the UEBA-based security event classification service.

17. The non-transitory computer-readable storage medium of claim 16, wherein when the event is ultimately classified as malicious, causing the endpoint protection platform to deny further execution of the process.

18. The non-transitory computer-readable storage medium of claim 16, wherein when the event is ultimately classified as likely safe or safe, causing the endpoint protection platform to permit execution of the process.

* * * * *